United States Patent

Gentile

[15] 3,653,714
[45] Apr. 4, 1972

[54] AUTOMATIC SAFETY SEAT BELTS

[72] Inventor: Michael Gentile, Route 4, Box 7, St. Charles, Ill. 60174

[22] Filed: Feb. 24, 1970

[21] Appl. No.: 13,338

[52] U.S. Cl. ............................. 297/385, 297/388, 180/82, 280/150 SB
[51] Int. Cl. ........................................................ A62b 35/60
[58] Field of Search ................. 297/384, 385, 388, 389, 390; 180/82; 280/150 SB; 200/61.58 SB; 340/278, 52 E

[56] References Cited

UNITED STATES PATENTS

| | | | |
|---|---|---|---|
| 3,343,623 | 9/1967 | Porter | 297/388 |
| 3,239,273 | 3/1966 | Pitney | 297/388 X |
| 3,190,694 | 7/1965 | Isaac | 297/388 |
| 3,300,910 | 1/1967 | Isaac | 297/388 |
| 3,391,961 | 7/1968 | Gardner et al. | 297/388 |
| 3,414,326 | 12/1968 | Raffaelli | 297/385 |

Primary Examiner—James T. McCall
Attorney—Edward C. Threedy

[57] ABSTRACT

Electrically controlled motor-driven safety seat belts that include complementary belt sections yieldably preshaped so that they may be retracted out of position when not in use, yet, when projected by their motor units energized through the ignition system of the vehicle, they will embrace the occupant of the vehicle seat and be automatically tightened thereabout.

4 Claims, 5 Drawing Figures

PATENTED APR 4 1972 3,653,714

INVENTOR
MICHAEL GENTILE
Edward C. Threedy
HIS ATTORNEY

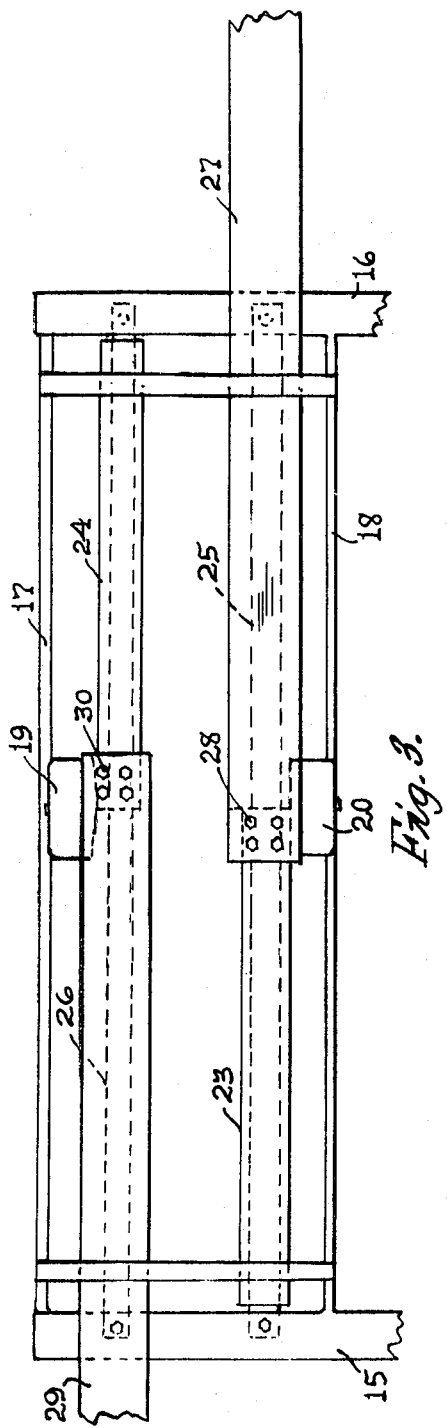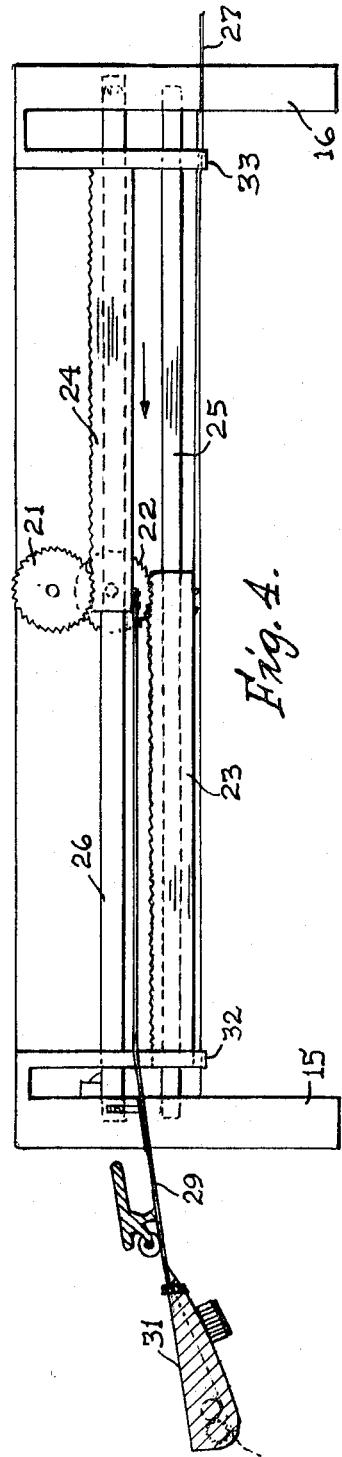

ns of this invention are adapted

AUTOMATIC SAFETY SEAT BELTS

SUMMARY OF THE INVENTION

An improvement in automatic electrically controlled safety seat belt comprising complementary body-embracing belt sections each respectively responsive to a motor-driven gear and rack type arrangement whereby they are retracted and/or projected into and out of body-embracing position. The belt sections are projected out of their retracted position through an electric circuit initially energized through the vehicle ignition system, such that they automatically embrace the occupant of the seat of the vehicle and, upon coupling of the belt sections together, the respective movements thereof will be reversed until, in response to a pressure switch, the safety belt is in body-embracing position.

GENERAL DESCRIPTION

The invention will be best understood by reference to the accompanying drawings in which the preferred embodiment of the invention is shown and in which:

FIG. 3 is a fragmentary front elevational view showing the structure of the invention in its normal closed or retracted condition;

FIG. 4 is a top plan view similar to FIG. 3, showing the parts in their retracted condition;

Figure 1:
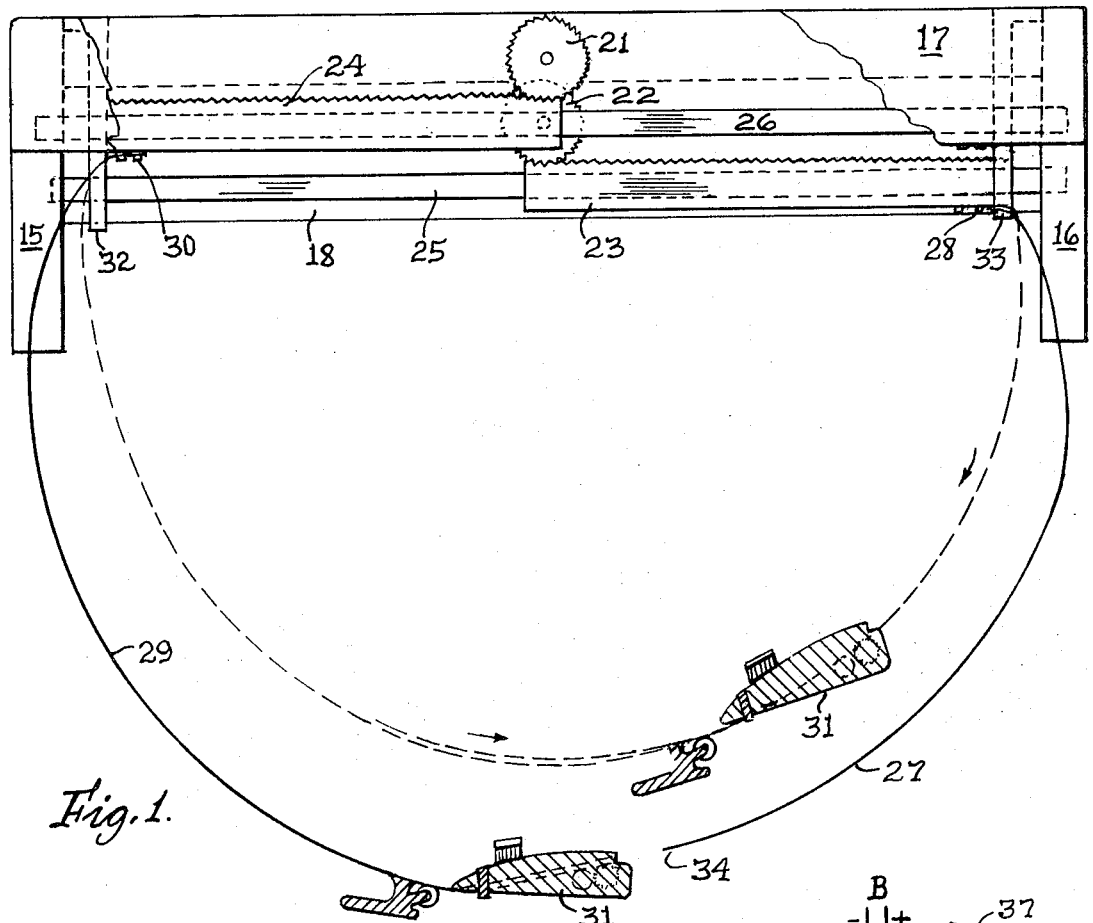
FIG. 1 is a top plan view of the structural elements of the invention and showing in dotted lines a retracted body-embracing condition.
Figure 2:
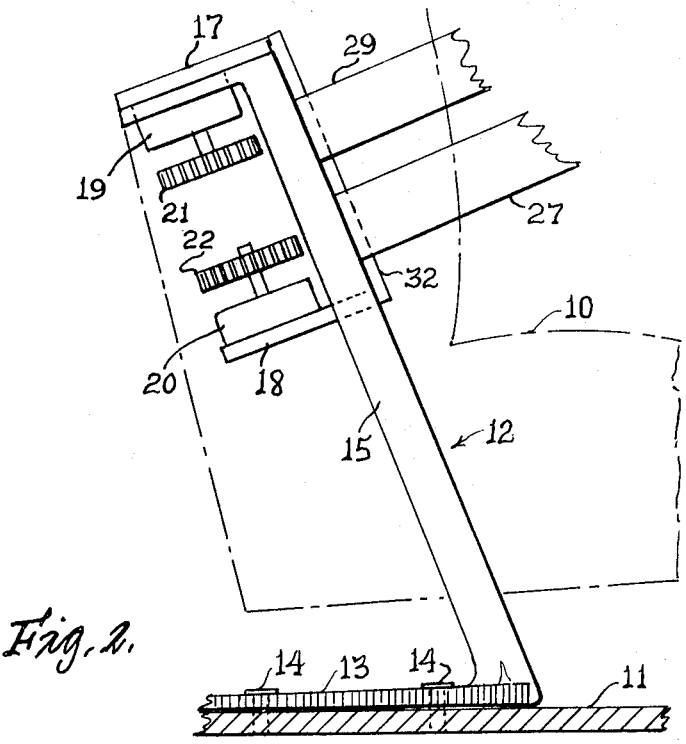
FIG. 2 is a fragmentary detail sectional view showing the supporting structure and motor drives for the automatic safety seat belts.

The automatic safety seat belts of this invention are adapted to be included as part of a vehicle seat structure 10 and, as such, may be connected to the mounting frame 11 of such seat structure. The invention specifically includes an inclined bracket 12 that provides a horizontally extending base flange 13, which, by suitable bolts 14 and the like, is connected to the mounting frame 11 of the seat structure 10.

The bracket 12 includes a pair of uprights 15 and 16 which have their free ends joined together by a top wall 17. Extending in a spaced parallel relation to the top wall 17 is a shelf 18. Mounted upon the top wall 17 so as to depend therefrom and on the shelf 18, are a pair of electric motors 19 and 20. Each of these motors 19 and 20 have connected to their rotatable shafts, gears 21 and 22. These gears 21 and 22 are adapted to be operatively connected to rack bars 23 and 24 which are slidable upon supporting arms 25 and 26 which extend between the uprights 15 and 16.

As viewed in FIG. 3, I show one belt section 27 having one end thereof connected as at 28 to one end of the rack bar 23. The other belt section 29 has its corresponding end connected as at 30 to one end of the rack bar 24. As shown in FIG. 3, the belt sections 27 and 29 are in their retracted position with their respective rack bars 23 and 24 slidably positioned at opposite ends of their respective supporting arms 25 and 26.

It is noted that the free end of the belt section 29 provides an enlarged housing 31 which contains some of the electrical components included in the control circuit for the seat belts. To guide the seat belts 27 and 29 as they are moved out of their retracted position, there are provided guide brackets 32 and 33 carried by the uprights 15 and 16. As shown in Fig. 3, the guide bracket 32 is adjacent to the uprights 15, while the guide bracket 33 is adjacent the upright 16, such that each of the guide brackets 32 and 33 guide the belt sections 27 and 29, respectively.

As the seat belts are made of a yieldable material, they can be pre-formed so as to have inherent memory to assume the condition shown in Fig. 1, wherein their opposite free ends tend to meet so as to either automatically be mated or manually mated, such that the free end 34 of the belt section 27 will be projected into and through the head 31 carried on the free end of the belt section 29.

Figure 5:
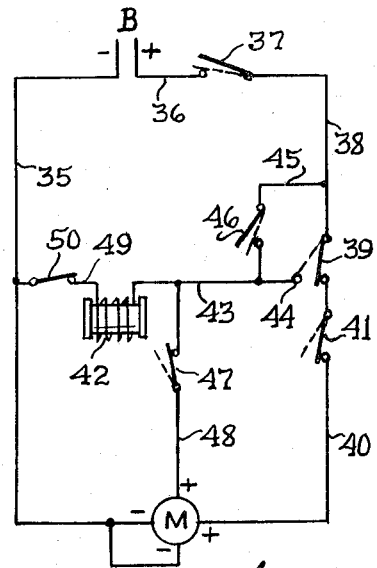
FIG. 5 is a schematic control circuit for the automatic safety seat belts.

In Fig. 5 there is disclosed a schematic circuitry for the automatic projection or retraction of the belt sections 27 and 29, which circuit includes connection lines 35 and 36 to a power source, such as an automobile battery "B." In line 36 will be included the vehicle ignition switch 37. One side of the switch 37 by a line 38 will be connected to one side of a clamp switch 39. The other side of the clamp switch 39 by line 40 will be connected to one side of each of the reversible motors 19 and 20 (there being only one motor illustrated in the schematic view). Included in line 40 is a relay switch 41 which is responsive to a relay 42 which in turn is connected by a line 43 to contact 44 of the clamp switch 39. A by-pass line 45 including a second relay 46, extends around the clamp switch 39 from line 38 to line 43. From line 43 and through a pressure switch 47, the reversing coils of the motor are connected to line 48. The other side of the relay 42 through line 49 and a limit switch 50, is connected to line 35 and the other side of the power source.

In operation, when an occupant is seated upon the seat structure 10 and closes the ignition switch 37, a circuit is completed through the motors 19 and 20 which runs through line 38, normally closed clamp switch 39, normally closed relay switch 41, line 40, the motors, and line 35, back to the other side of the power source. Upon energization of the motors, the gears 21 and 22 associated therewith will be rotated so as to move their respective rack bars 23 and 24 in opposite directions over their supporting arms 25 and 26.

This movement will project the belt sections 27 and 29 into their body-embracing condition and will continue until the respective ends are mated through the housing 31, which opens the clamp switch 39. The opening of the clamp switch 39 deenergizes the motors. As the clamp switch 39 opens, it will engage contact 44 and thus, through line 43 and the closed pressure switch 47 and line 48, reversely energize the motors so as to commence retracting the belt sections 27 and 29. The opening of the clamp switch 39 will also effect energization of the relay 42, opening the normally closed relay switch 41 and closing the normally open relay switch 46. Thus, the motors are reversely energized and will continue to be so until the pressure switch 47 is opened by engagement with the body of the occupant of the vehicle seat. Thus, the opening of the pressure switch 47 deenergizes the motors and they remain in that condition until the occupant of the seat opens the clamped seat belts, again closing the clamp switch 39. However, as the relay 42 is maintained energized through the closing of its relay switch 46, the motors will not be energized through the now closed clamp switch 39 because the relay switch 41 is open. The unclamping of the seat belt sections 27 and 29 releases the pressure on the pressure switch 47, permitting it to reclose and thus energizing the motors such that they retract the seat belts 27 and 29. The seat belts will be retracted until the limit switch 50 is opened through the movement of the retracting seat belts and such switch 50, upon opening, will deenergize the relay 42, reversing the conditions of the relay switchs 41 and 46. If the occupant does not now open the ignition switch 47, the seat belts will automatically be positioned back into safety body-embracing condition.

In the embodiment of this invention, the enlarged head 31 of the belt section 29 will include the clamp switch 39 and pressure switch 47. These will be connected by suitable conduits which can extend through the belt section 29 so as to be correctly connected to the remaining portions of the necessary electrical circuit.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. Automatic safety seat belts for vehicle occupants including resiliently pre-shaped belt sections having a retracted position to provide an unobstructed vehicle seat and a projected position to releasably embrace the body of the occupant of the seat, wherein the improvement provides
  a. a fixed structure within the seat of the vehicle movably supporting the seat belt sections,
  b. a gear and rack assembly carried by said fixed structure within the seat, with a rack for each belt section movable in opposite directions with respect to each other to project and retract each of the seat belt sections about and away from an occupant of the vehicle seat,
  c. means for operating said gear and rack assembly to project and retract the seat belt sections into and out of body-embracing positions, and
  d. control means for said operating means for projecting the seat belt sections into body-embracing positions and then retracting the seat belt sections to a tightened position about the occupant of the vehicle seat, and for fully retracting the seat belt sections when not in use to provide an unobstructed vehicle seat.

2. Automatic safety seat belts as defined by claim 1 wherein said means for operating said gear and rack assemblies includes electric motors, each adapted to rotate the gear of said gear and rack assemblies so as to move its corresponding rack in opposite directions over said fixed structure within said seat of the vehicle.

3. Automatic safety seat belts as defined by claim 1 wherein said control means includes an electric circuit for said operating means having operatively associated therewith a seat belt clamp switch for controlling the projection of the seat belts into body-embracing positions, and a pressure switch for controlling the degree of retraction of the seat belt sections into tightened position about the occupant of the vehicle seat, and a relay and relay switches for fully retracting the seat belt sections.

4. Automatic safety seat belts as defined by claim 2 wherein said control means includes an electric circuit for said operating means having operatively associated therewith a seat belt clamp switch for controlling the projection of the seat belts into body-embracing positions, and a pressure switch for controlling the degree of retraction of the seat belt sections into tightened position about the occupant of the vehicle seat, and a relay and relay switches for fully retracting the seat belt sections.

* * * * *